US012282089B2

(12) United States Patent
Sevagamoorthy et al.

(10) Patent No.: US 12,282,089 B2
(45) Date of Patent: Apr. 22, 2025

(54) OCCLUSION CONSTRAINTS FOR RESOLVING TRACKS FROM MULTIPLE TYPES OF SENSORS

(71) Applicant: Aptiv Technologies AG, Schaffhausen (CH)

(72) Inventors: Ganesh Sevagamoorthy, Troy, MI (US); Syed Asif Imran, Moorpark, CA (US)

(73) Assignee: Aptiv Technologies AG, Schaffhausen (CH)

( * ) Notice: Subject to any disclaimer, the term of this patent is extended or adjusted under 35 U.S.C. 154(b) by 386 days.

(21) Appl. No.: 17/457,888

(22) Filed: Dec. 6, 2021

(65) Prior Publication Data

US 2023/0046396 A1 Feb. 16, 2023

Related U.S. Application Data

(60) Provisional application No. 63/233,114, filed on Aug. 13, 2021.

(51) Int. Cl.
*G01S 13/931* (2020.01)
*B60W 30/09* (2012.01)
*G01S 13/86* (2006.01)

(52) U.S. Cl.
CPC .......... *G01S 13/931* (2013.01); *B60W 30/09* (2013.01); *G01S 13/867* (2013.01);
(Continued)

(58) Field of Classification Search
CPC ................. G01S 13/931; G01S 13/867; G01S 2013/9322; B60W 30/09; B60W 2420/52;
(Continued)

(56) References Cited

U.S. PATENT DOCUMENTS 8,180,107 B2 * 5/2012 Broaddus .............. G01S 13/867
382/103
10,565,468 B2 * 2/2020 Schiffmann ............. G01S 13/42
(Continued)

FOREIGN PATENT DOCUMENTS

EP 3196668 A1 7/2017

OTHER PUBLICATIONS

"Extended European Search Report", EP Application No. 22168157.0, Oct. 25, 2022, 13 pages.
(Continued)

*Primary Examiner* — Tarek Elarabi
(74) *Attorney, Agent, or Firm* — Harness, Dickey & Pierce, P.L.C.

(57) ABSTRACT

Perception systems and methods include use of occlusion constraints for resolving tracks from multiple types of sensors. An occlusion constraint is applied to an association between a radar track and vision track to indicate a probability of occlusion. The perception systems and methods refrain from evaluating occluded and collected radar tracks and vision tracks. The probability of occlusion is utilized for deemphasizing pairs of radar tracks and vision tracks with a high likelihood of occlusion and therefore, not useful for tracking. Improved perception data is provided and more closely represents multiple complex data sets for a vehicle to prevent a collision with an occluded object as the vehicle operates in an environment.

18 Claims, 9 Drawing Sheets

(52) U.S. Cl.
CPC ............... *B60W 2420/408* (2024.01); *B60W 2554/4042* (2020.02); *B60W 2554/4043* (2020.02); *B60W 2554/801* (2020.02); *B60W 2554/802* (2020.02); *G01S 2013/9322* (2020.01)

(58) Field of Classification Search
CPC . B60W 2554/4042; B60W 2554/4043; B60W 2554/801; B60W 2554/802
See application file for complete search history.

(56) References Cited

U.S. PATENT DOCUMENTS

| | | | | |
|---|---|---|---|---|
| 2010/0208941 | A1* | 8/2010 | Broaddus | G08B 13/19608 382/103 |
| 2014/0142800 | A1* | 5/2014 | Zeng | G06F 11/3055 701/30.6 |
| 2017/0206436 | A1* | 7/2017 | Schiffmann | G01S 13/931 |

OTHER PUBLICATIONS

Jonker, et al., "A Shortest Augmenting Path Algorithm for Dense and Sparse Linear Assignment Problems", May 6, 1986, 16 pages.
Kuhn, "The Hungarian Method for the Assignment Problem", Naval Research Logistics Quarterly, vol. 2, Issue 1-2, Mar. 1955, 15 pages.
Miller, et al., "Optimizing Murty's ranked assignment method", Jul. 1997, 17 pages.
Murty, "An Algorithm for Ranking all the Assignments in Order of Increasing Cost", May 2, 1967, 6 pages.
Office Action issued in Corresponding EP App. No. 221681570 dated Jan. 22, 2025.
Mohd Asyraf Zulkifley et al: "Robust hierarchical multiple hypothesis tracker for multiple-object tracking", Expert Systems with Application vol. 39, No. 16, pp. 12319-12331, XP028451655, ISSN: 0957-4174, DOI: 10.1016/J.ESWA.2012.03.004, retrieved/ published on Jun. 6, 2012.

* cited by examiner

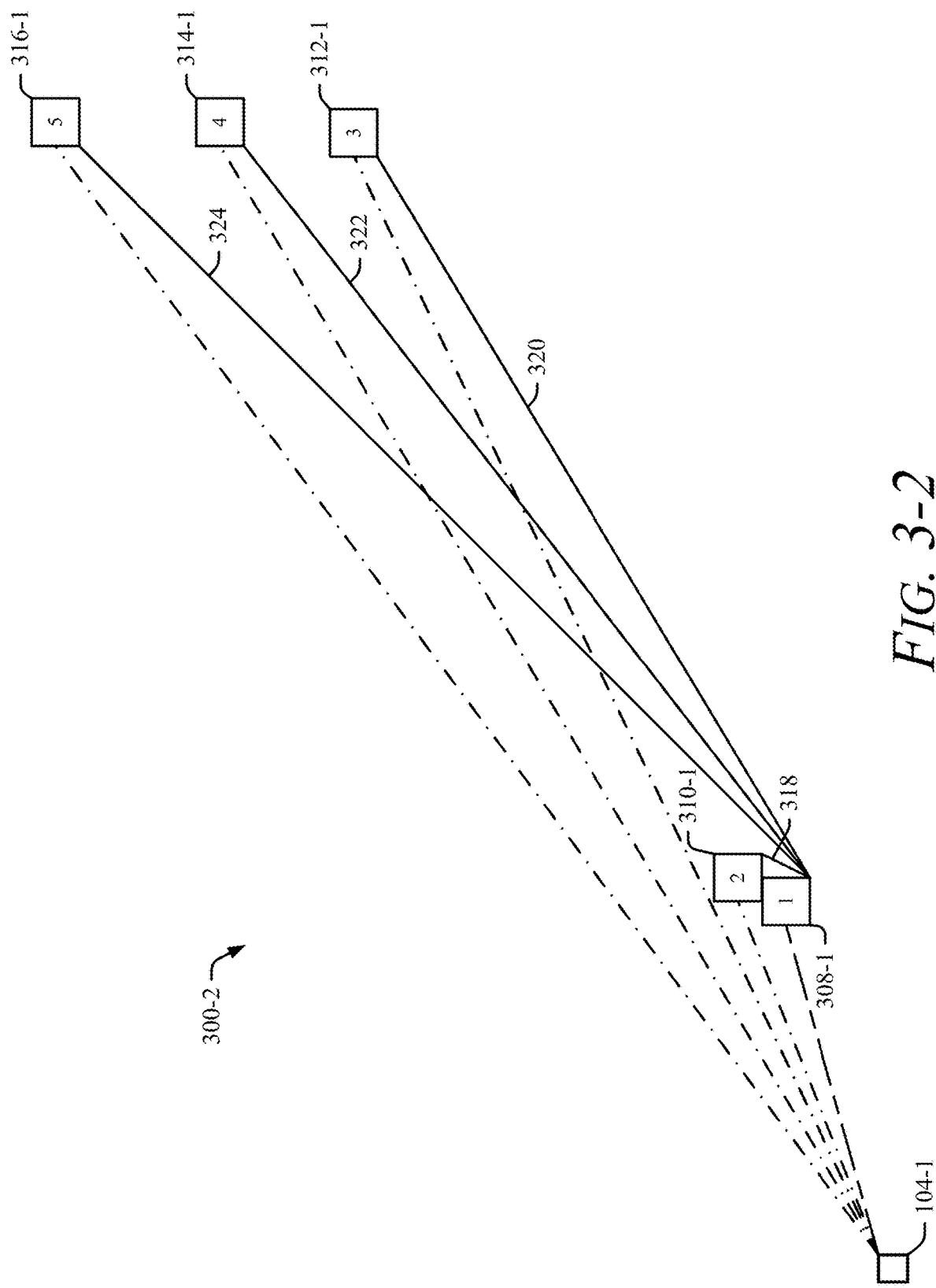

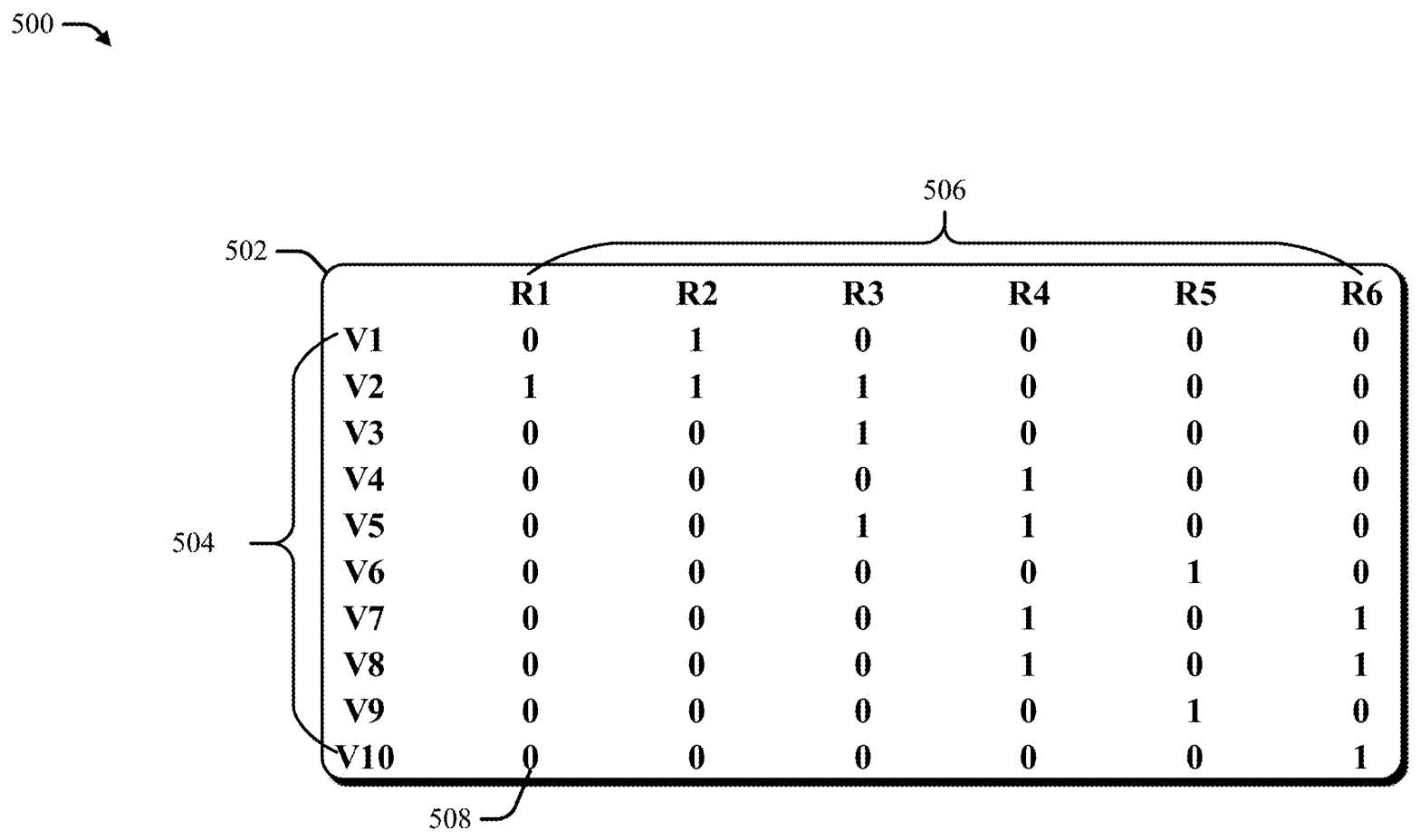

| | R1 | R2 | R3 | R4 | R5 | R6 |
|---|---|---|---|---|---|---|
| V1 | 0 | 1 | 0 | 0 | 0 | 0 |
| V2 | 1 | 1 | 1 | 0 | 0 | 0 |
| V3 | 0 | 0 | 1 | 1 | 0 | 0 |
| V4 | 0 | 0 | 0 | 1 | 0 | 0 |
| V5 | 0 | 0 | 1 | 0 | 1 | 0 |
| V6 | 0 | 0 | 0 | 1 | 0 | 1 |
| V7 | 0 | 0 | 0 | 1 | 1 | 1 |
| V8 | 0 | 0 | 0 | 0 | 0 | 0 |
| V9 | 0 | 0 | 0 | 0 | 1 | 1 |
| V10 | 0 | 0 | 0 | 0 | 0 | 1 |

*FIG. 5-1*

|    | V1  | V2  | V3  | V4  |
|----|-----|-----|-----|-----|
| R1 | 5.1 | 0   | 0   | 0   |
| R2 | 1.0 | 0   | 0   | 0   |
| R3 | 0   | 1.5 | 0   | 0   |
| R4 | 0   | 2.5 | 0   | 0   |
| R5 | 0   | 0   | 2.1 | 0   |
| R6 | 0   | 0   | 0   | 1.9 |

→ 514

|    | V1    | V2    | V3  | V4  |
|----|-------|-------|-----|-----|
| R1 | 5.1   | 0     | 0   | 0   |
| R2 | (9.0) | 0     | 0   | 0   |
| R3 | 0     | 1.5   | 0   | 0   |
| R4 | 0     | (9.5) | 0   | 0   |
| R5 | 0     | 0     | 2.1 | 0   |
| R6 | 0     | 0     | 0   | 1.9 |

OCCLUSION CONSTRAINTS FOR RESOLVING TRACKS FROM MULTIPLE TYPES OF SENSORS

CROSS-REFERENCE TO RELATED APPLICATIONS

This application claims the benefit under 35 U.S.C. 119(e) of U.S. Provisional Application No. 63/233,114, filed Aug. 13, 2021, the disclosure of which is incorporated by reference in its entirety herein.

BACKGROUND

In some automobiles, a perception system may combine information (e.g., azimuth, vehicle speed, yaw rate, position) obtained from multiple sensors to support autonomous or semi-autonomous controls. The combined sensor data can be used to estimate objects of interest that are present in a field-of-view (FOV). Inferences of position, velocity, trajectory, size, class, and other parameters can be made for each object being tracked; accuracy of these inferences increases when different types of sensors are used. Correlating inputs from multiple sensors for purposes of object tracking can be computationally complex, often requiring sophisticated and expensive processing hardware to handle conflicting results. To ensure safe and precise vehicle control that avoids object collisions, it is desirable for perception systems to be able to resolve large sets of sensor data in an accurate and time-efficient manner.

SUMMARY

This document describes techniques for using occlusion constraints for resolving tracks from multiple types of sensors. Systems, methods, and apparatuses in accordance with these techniques may enable a perception system to modify radar track data and vision track data being used for object tracking by using occlusion constraints that deemphasize from consideration, pairs of radar and vision tracks that appear to be occluded, for improving speed and accuracy of identifying objects within a field of view, e.g., from radar and vision track pairs that are not deemphasized.

In aspects, a method for occlusion constraints for resolving tracks from multiple types of sensors is disclosed that includes determining, by a perception system of a vehicle, whether an occlusion condition exists between vision tracks and radar tracks generated for an environment. Responsive to determining that an occlusion condition exists between a vision track and a radar track, applying an occlusion constraint to an association maintained between the vision track and the radar track. The occlusion constraint is effective to modify the association maintained between the vision track and the radar track from consideration during tracking. After applying the occlusion constraint to the association maintained between the vision track and the radar track, the perception system determines an object in the environment at a position derived from the other vision track and the other radar track based on another association maintained between another vision track and another radar track. The method includes outputting an indication of the object in the environment for tracking the object to control the vehicle or to enable active safety features of the vehicle for preventing a collision with the object as the vehicle operates in the environment.

In other aspects, a system includes a processor configured to perform this and other methods. Systems having means for performing this and other methods for using occlusion constraints for resolving tracks from multiple types of sensors are disclosed.

This Summary is provided to introduce simplified concepts of techniques and apparatuses for occlusion constraints for resolving tracks from multiple types of sensors, the concepts of which are further described below in the Detailed Description and Drawings.

BRIEF DESCRIPTION OF THE DRAWINGS

Techniques for using occlusion constraints for resolving tracks from multiple types of sensors are described below with reference to the following drawings that use some of the same reference numbers throughout to reference like or examples of like features and components:

FIG. 3-1 illustrates example scenarios for implementing sensors and data used in occlusion constraints for resolving tracks from multiple types of sensors;

FIG. 3-2 illustrates additional example scenarios for implementing sensors and data used in occlusion constraints for resolving tracks from multiple types of sensors;

FIG. 5-1 illustrates an example implementation of a feasibility matrix for performing occlusion constraints for resolving tracks from multiple types of sensors;

FIG. 5-2 illustrates another example implementation of cost matrix for performing occlusion constraints for resolving tracks from multiple types of sensors;

DETAILED DESCRIPTION

Overview

This document describes techniques for using occlusion constraints for resolving tracks from multiple types of sensors. Vehicle perception systems are challenged with quickly and correctly determining correlations among multiple sets of sensor data or sensor readings (e.g., radar sensor readings, ultrasound sensor readings, infrared camera sensor readings, optical or "vision" camera sensor readings, lidar sensor readings). Each sensor may collect information utilized for identifying a single object, multiple objects, or a portion of a single object within the perception system's FOV. In a congested FOV (e.g., when many objects exist including vehicle and pedestrian traffic, or when the FOV encompasses a large space including a three hundred sixty degree view), the perception system may underperform due to attempting to process large quantities of data. Perception system performance can be improved by efficiently using occlusion constraints, as described, to improve or preprocess the sensor data and enable more efficient or faster object identification.

Vehicle perception systems process significant quantities of data in an accurate and time-efficient manner to navigate without colliding with other moving objects in their environment. Multiple sensors (e.g., radar sensors, vision sensors) may send a stream of rapidly evolving data regarding a changing environment. Problems may arise when too much sensor data queued for processing overloads the perception system. The perception system may provide delayed or inaccurate data which can result object collisions.

The occlusion constraints described herein, when used for resolving tracks from multiple types of sensors, may allow a vehicle to process sensor data faster and with a higher degree of accuracy. By deemphasizing from consideration some of the data in track association based on occlusion constraints, an increase in functional performance and scalability of a perception system occurs as the perception system can quickly handle even larger combinations of sensors or larger sets of data.

While features and concepts of the described techniques and apparatuses for occlusion constraints for resolving tracks from multiple types of sensors can be implemented in any number of different environments, aspects are described in the context of the following examples that are described primarily for controlling, or assisting control of, a vehicle or enabling vehicle safety systems.

Example Environment

Figure 1:
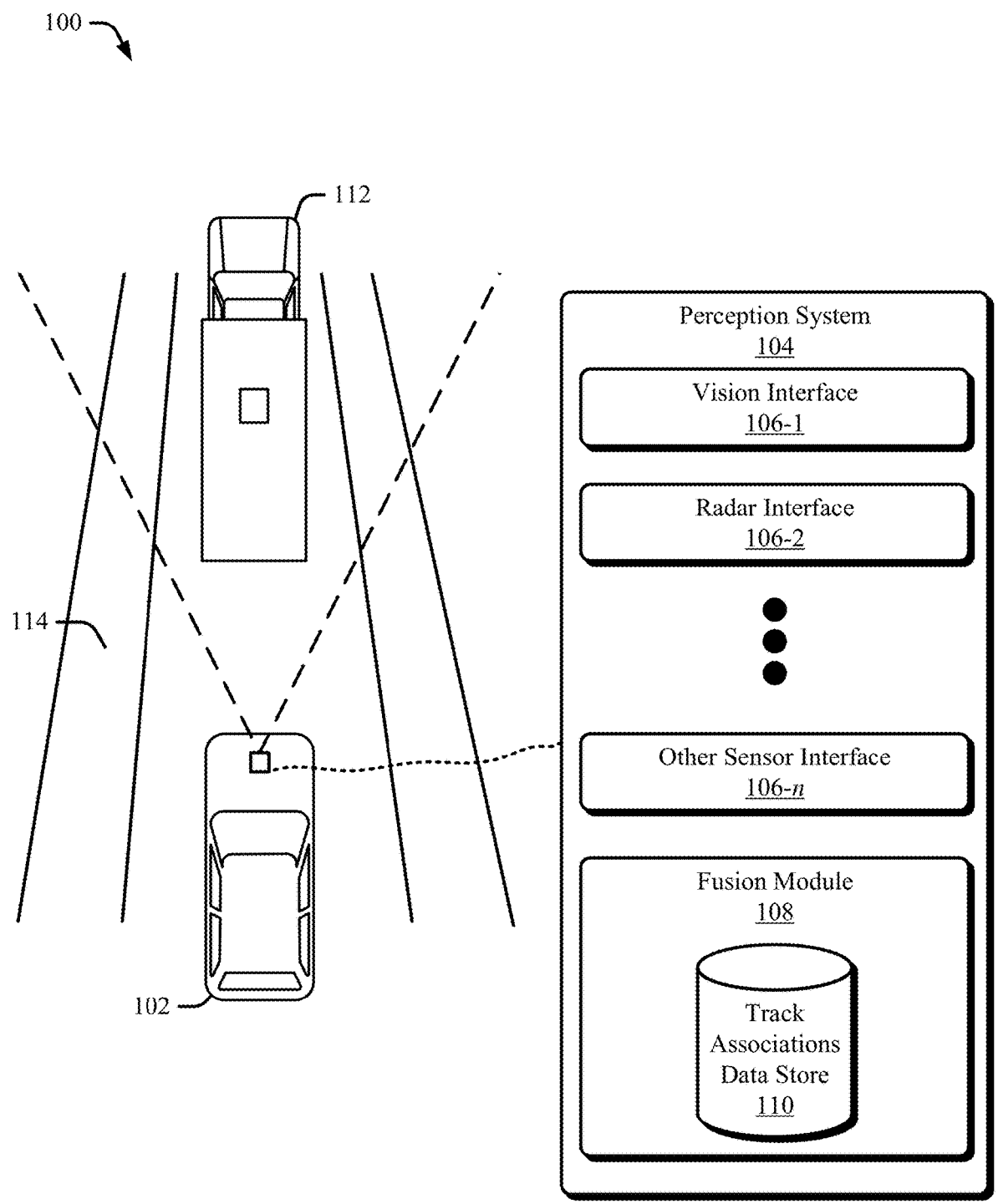
FIG. 1 illustrates an example operating environment of a vehicle implementing occlusion constraints for resolving tracks from multiple types of sensors.

FIG. 1 illustrates an example operating environment 100 of a vehicle 102 with a perception system 104 configured to perform occlusion constraints for resolving tracks from multiple types of sensors in accordance with the techniques described herein. The perception system 104 illustrated may include sensor interfaces 106, to multiple types of sensors used for object tracking. The sensor interfaces 106 include, as some examples, a vision interface 106-1, radar interface 106-2, and another sensor interface 106-n (e.g., lidar interface, ultrasound interface, infrared interface). The perception system 104 may also include a fusion module 108. The fusion module 108 may include a track associations data store 110 for storing information obtained from the vision interface 106-1, radar interface 106-2, and another sensor interface 106-N. As illustrated, the perception system 104 is used to perceive the presence of another vehicle 112; however, the perception system 104 could be used to perceive any object (e.g., pedestrian, traffic cone, building).

In some respects, the perception system 104 may include the sensor or sensors associated with the sensor interfaces 106. In other examples, the perception system 104 is operatively linked to the sensors, which may be part of other systems of the vehicle 102. For example, the perception system may include a vision sensor coupled to the vision interface 106-1, a radar sensor coupled to the radar interface 106-2, and an ultrasound sensor, a lidar sensor, an infrared sensor or any other type of sensor coupled to the other sensor interface 106-N.) Information obtained by the sensor interfaces 106 may be utilized to calculate speed, range, and azimuth as factors in evaluating occlusion probability, for example, in furtherance of object tracking.

The perception system 104 may be utilized to detect and avoid a collision with another vehicle 112. For example, the perception system 104 utilizes information obtained from the vision interface 106-1 and the radar interface 106-2, that when processed by the fusion module 108, can be used to determine the presence of the vehicle 112 and take preventative measures to avoid a collision with the vehicle 112.

In another example, the perception system 104 may utilize further information obtained from the other sensor interface 106-n (e.g., a lidar interface, an ultrasound interface), in combination with the information obtained from the vision interface 106-1, the radar interface 106-2, to enable the fusion module 108 to determine the presence of a one or more occluded objects on a road 114. For example, a vehicle 102 may be traveling along a road 114 and utilize a perception system 104 to determine the presence of another vehicle 112 that is occluded from view and take preventative measures to avoid a collision with the vehicle 112.

In general, manufacturers can mount the perception system 104 to any moving platform traveling on the road 114. The perception system 104 can project its FOV from any exterior surface of the vehicle 102. For example, vehicle manufacturers can integrate at least a part of the perception system 104 into a side mirror, bumper, roof, or any other interior or exterior location where the FOV includes the road 114 and objects moving or stationary that are near the road 114. Manufacturers can design the location of the perception system 104 to provide a FOV that sufficiently encompasses the road 114 on which the vehicle 102 may be traveling. In the depicted implementation, a portion of the perception system 104 is mounted near the forward section of the vehicle 102.

In aspects, an occlusion constraint is applied to an association between a radar track and vision track located in the track associations data store 110 to indicate a probability of occlusion. In other aspects, a vehicle 102 may refrain from evaluating occluded radar tracks and vision tracks collected by a perception system 104. The probability of occlusion is utilized for decreasing association probabilities for pairs of radar tracks and vision tracks with a high likelihood of occlusion and therefore, not useful for tracking. Improved data collected by the perception system 104 can more closely represent multiple complex data sets for the vehicle 102 for preventing a collision with an occluded object as the vehicle operates in the environment 100. The occlusion constraints, when used for resolving tracks from multiple types of sensors, may allow the perception system 104 to process sensor data faster and with a higher degree of accuracy. An increase in functional performance and scalability of the perception system 104 may occur by deemphasizing from consideration some of the data from application of occlusion constraints.

Figure 2:
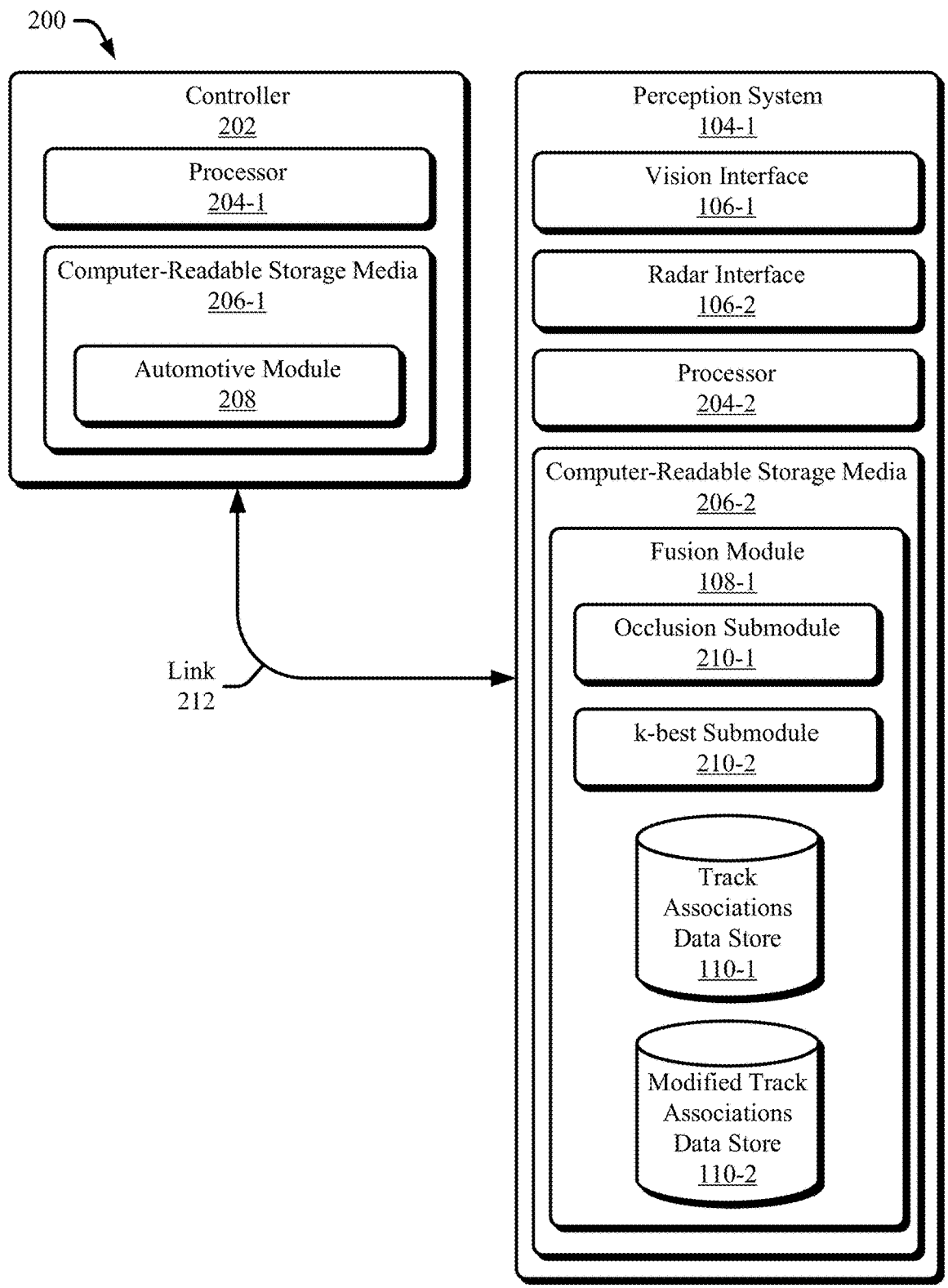
FIG. 2 illustrates examples of sensors and data used in occlusion constraints for resolving tracks from multiple types of sensors.

FIG. 2 illustrates an example system 200 in which occlusion constraints for resolving tracks from multiple types of sensors for a vehicle 102 may be implemented. The example system 200 illustrated in FIG. 2 includes a controller 202 containing a processor 204-1 and computer-readable storage media (CRM) 206-1 (e.g., a memory, long-term storage, short-term storage), which stores instructions for an automotive module 208. The controller 202 and the perception system 104-1 may communicate over a link 212. The link may be a wired or wireless link, and in some cases, includes a communication bus. The controller 202 performs operations based on information received over the link 212, such as an indication of one or more objects traveling on the road 114.

The perception system 104-1 contains a vision interface 106-1, a radar interface 106-2, processor 204-1, processor 204-2, and a CRM 206-2. The CRM 206-2 can store instructions associated with a fusion module 108-1, for example, that may be executed by the processor 204-2 to execute operations of the fusion module 108. The fusion module 108-1 may include an occlusion submodule 210-1 and k-best pattern searching submodule 210-2 (also referred to as k-best submodule 210-2, for short), in addition to track associations data store 110-1 and modified track associations data store 110-2.

The processors 204-1 and 204-2 can be two separate processing units or a single processing unit (e.g., microprocessor, multiple processors in a processing unit) or a pair of single system-on-chip of a computing device, a controller, or a control unit. The processors 204-1 and 204-2 execute computer-executable instructions stored within the CRM 206-1 and the CRM 206-2.

Generally, the perception system 104-1 executes the fusion module 108-1 to perform an automotive function (e.g., engaging a brake system), which may include using output from the vision interface 106-1 and radar interface 106-2 for tracking objects, e.g., in the environment 100. The fusion module 108-1, when executed by the processor 204-2, can receive an indication of occluded objects detected by the occlusion submodule 210-1 to enable more accurate object tracking, for example. The system 200 is described below in further detail, with reference to example scenarios 300-1 and 300-2 shown in FIG. 3-1 and FIG. 3-2.

Figures 1, 3:
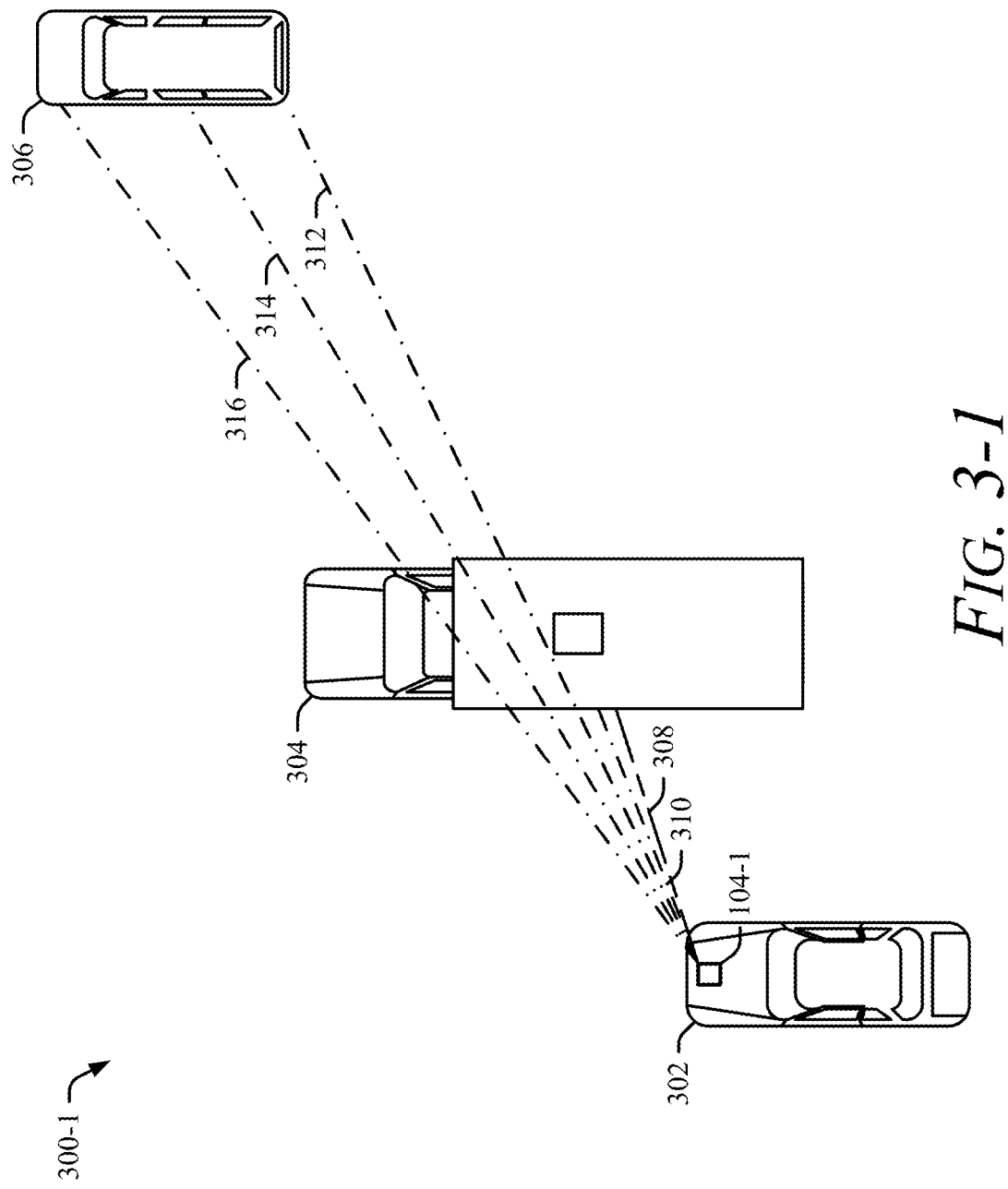

FIG. 3-1 illustrates an example scenario 300-1 in which occlusion constraints for resolving tracks from multiple types of sensors for a vehicle 302 could be implemented. A vehicle 302 is shown that includes the system 200, including the perception system 104-1, which in the scenario 300-1, is occluded by a truck 304 from visually detecting a moving car 306. The processor 204-2, modifying information obtained at the vision interface 106-1 of the perception system 104-1 of the vehicle 302, may be unable to detect the moving car 306 through information obtained from the vision interface 106-1 (e.g., through a vision sensor). However, the processor 204-2, modifying information obtained at the radar interface 106-2 of the perception system 104-1 of the vehicle 302, may detect the moving car 306 through information obtained from the radar interface 106-2 (e.g., through a radar sensor).

For purposes of example, the vision interface 106-1 (e.g., utilizing a vision sensor) of the perception system 104-1 on the vehicle 302 detects a vision track 308 and the radar interface 106-2 (e.g., utilizing a radar sensor) of the perception system 104-1, detects a first radar track 310, second radar track 312, third radar track 314, and fourth radar track 316. The vision track 308 cannot be used to detect the car 306 because it is occluded from view by the truck 304. The second radar track 312, third radar track 314, and fourth radar track 316 can be used to detect the car 306, but not the truck 304. In aspects, determining an object (e.g., the moving car 306) in the environment at a position derived from the vision track 308 and the radar tracks 310, 312, 314, 316 may include determining the presence of a moving car 306 detected by a radar sensor 312, 314, 316 and occluded from a vision sensor 308.

FIG. 3-2 further illustrates the example scenario of FIG. 3-1 in which occlusion constraints for resolving tracks from multiple types of sensors for a vehicle 302 could be implemented. The vehicle 302 again includes the system 200, including the perception system 104-1, which detects a vision track 308-1, first radar track 310-1, second radar track 312-1, third radar track 314-1, and fourth radar track 316-1. A first distance 318 is shown between positions indicated by the vision track 308-1 and first radar track 310-1. A second distance 320 is shown between positions indicated by the vision track 308-1 and second radar track 312-1. A third distance 322 is shown between positions indicated by the vision track 308-1 and third radar track 314-1. A fourth distance 324 is shown between positions indicated by the vision track 308-1 and fourth radar track 316-1.

The perception system 104-2 calculates the distance (e.g., 318, 320, 322, 324) between the positions of each vision track and radar track (referred to as "each track pair") and occlusion likelihood utilizing computer-readable storage media 206-2 which stores instructions for executing a fusion module 108-1. In aspects, the fusion module 108-1 includes an occlusion submodule 210-1 and k-best submodule 210-2 as well as a track associations data store 110-1 containing vision track (e.g., 308-1) and radar track (e.g., 310-1, 312-1, 314-1, 316-1) associations. The occlusion submodule 210-1 implements an occlusion constraint in a probabilistic framework to the track associations data within the track associations data store 110-1 resulting in a modified track associations data store 110-2. The k-best submodule 210-2 uses the modified track association data store 110-2 to obtain best set of hypotheses/patterns. This helps to avoid rerunning the k-best submodule 210-2, or any other pattern searching algorithm, when the best pattern contains a pair that does not satisfy occlusion condition.

The occlusion submodule 210-1 may perform occlusion reasoning when multiple radar tracks are competing candidates to be associated with a particular vision track. In such circumstances, it may happen that one radar track that is closer to a detected object in terms of position is completely or partially occluded by one or more radar tracks that are distant to the vision track but closer in distance to the ego vehicle. In such a scenario, the vision track is more likely to be associated with the occluding radar track than the relatively nearer occluded radar tracks. The probability of occlusion between a vision and radar track can be derived from several factors, not just distance, including a total quantity of occluding radar tracks for a given radar track, an amount of overlap between the occluding radar tracks and the given track, an azimuth uncertainty of both the occluding and the occluded radar tracks, and a probability of each of the occluding radar tracks being associated with other vision tracks.

In aspects, the probability of occlusion for each of the radar tracks and vision tracks of the cost matrix is calculated. For example, the track associations data store 110-1 of FIG. 2 may include associated vision-radar track pairs (e.g., vision track 308 paired with radar track 310, vision track 308 paired with radar track 312, vision track 308 paired with radar track 314, and vision track 308 paired with radar track 316). The modified track associations data store 110-2 may include association costs of vision-radar track pairs that have been modified according to an occlusion constraint. In additional aspects, calculating the probability of occlusion can be modified based on a scenario as well as properties of a set of sensors. For example, the fusion modules 108, and 108-1 can rely on other information as well to derive whether occlusion exists between pairs of tracks.

In some respects, factors that drive a probability of occlusion include an amount of angular overlap. For instance, determining the probability of occlusion is based on a total quantity of the radar tracks (e.g., 310-1, 312-1, 314-1, 316-1) that at least partially overlap in azimuth with a particular vision track (e.g., 308-1) and an occluded radar track, and an amount of angular overlap associated with the total quantity of the radar tracks that at least partially overlap in azimuth with that occluded radar track. A greater quantity of occluding radar tracks can make it increasingly difficult for a radar track to have a feasible vision track match. The azimuth overlap between occluding radar tracks (e.g., 312-1, 314-1, 316-1) and an occluded radar (e.g., 310-1) track is considered in obtaining occlusion probabilities.

In examples, factors calculated can include the extent angles of all the occluding radar tracks and the portion of overlap with the extent angles of an occluded radar track may be further calculated. This probability may then be combined with a number of occluding radar tracks to determine an occlusion penalty by multiplication.

The perception system 104-1 is in communication through a link 212 with the controller 202 including a processor 204-1 and computer-readable storage media 206-1, which stores instructions for executing an automotive module 208 capable of controlling, or assisting control of, a vehicle 302, or enabling vehicle 302 safety systems. In the illustrated example of FIG. 3-2, the modified track associations data store 110-2 may be transmitted by the perception system 104-1 to the controller 202 of the vehicle 302 for purposes of enabling vehicle safety systems in order to avoid a collision with the occluded car 306.

Figure 4:
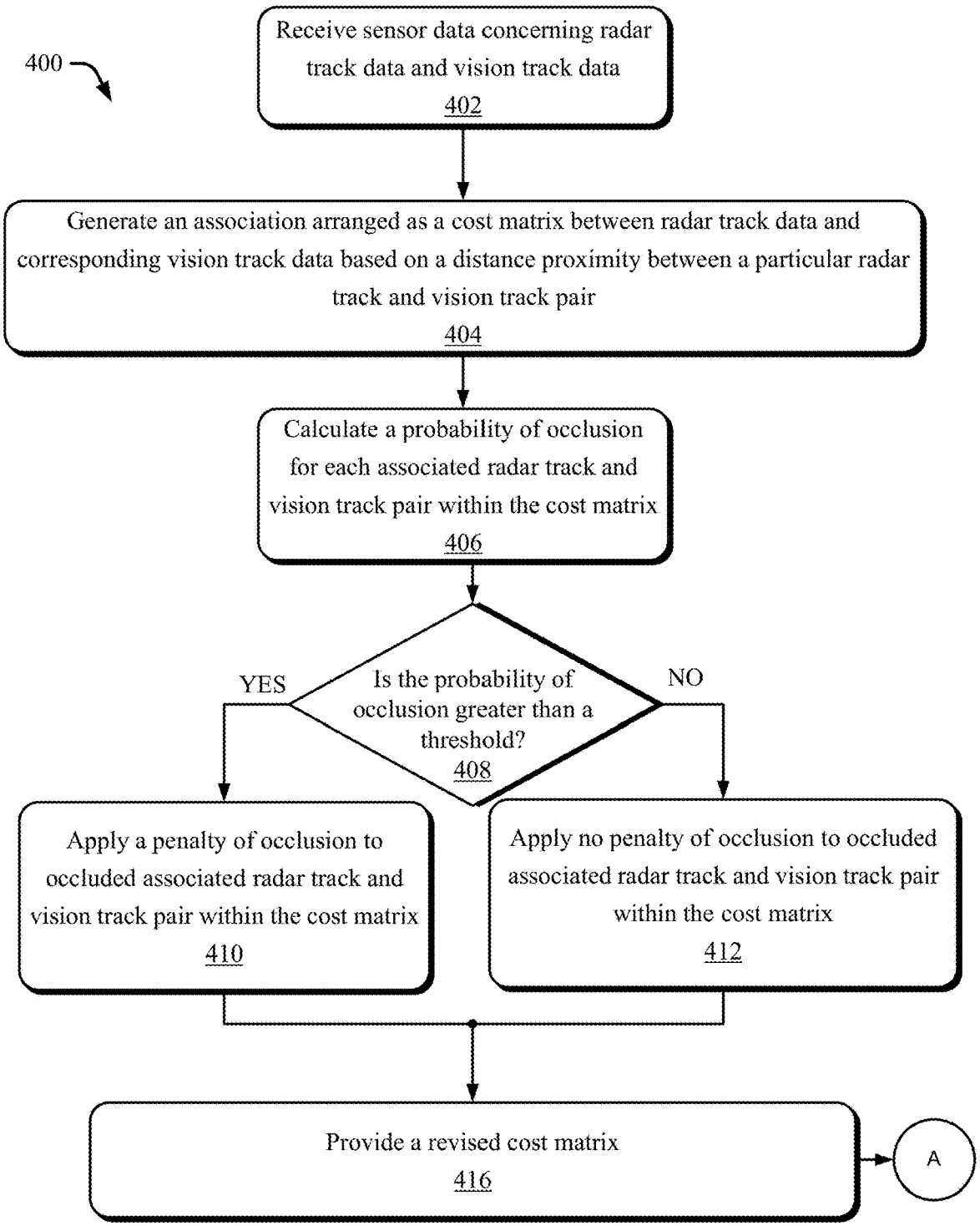
FIG. 4 illustrates example methods used in occlusion constraints for resolving tracks from multiple types of sensors.

FIG. 4 illustrates an example method 400 of performing occlusion constraints for resolving tracks from multiple types of sensors in accordance with the techniques described herein. The perception system 104 receives sensor data concerning radar track data and vision track data 402. The perception system 104 generates an association arranged as a cost matrix between radar track data and corresponding vision track data based on a distance proximity in terms of kinematic and attribute information between a radar track and vision track pair 404. Examples of kinematic information include position of an object, velocity of an object, object heading, and size of particular track. Whereas, examples of attribute information include whether an object is classified as a pedestrian, vehicle, guardrail, stop sign, or some other object for consideration. More specifically, a cost matrix may be generated by from the vision-radar track pairs located in the track associations data store 110-1. The perception system 104 is configured to calculate a probability of occlusion for each associated radar track and vision track pair within the cost matrix 406. The probability of occlusion may be calculated by the occlusion submodule 210-1. The occlusion submodule 210-1 may determine the probability of occlusion based on the extent angles of the occluding radar tracks combined with a number of occluding radar tracks to determine an occlusion penalty.

If the perception system 104 finds the probability of occlusion to be above a threshold for a radar track and vision track pair 408, then the perception system 104 applies a penalty of occlusion to each occluded associated radar track and vision track pair within the cost matrix 410. If the perception system 104 decides not to penalize a radar track and vision track pair 408, it does not apply any penalty and retains the original cost to each occluded associated radar track and vision track pair within the cost matrix 412. The inclusion of occlusion penalty to the original cost will decrease the probability of the radar-vision pair to be included in the best hypotheses generated by the k-best submodule 210-2. After modifying association costs of radar track and vision track pairs as per probability of occlusion within the cost matrix, the perception system 104 may provide a revised cost matrix represented by "A". The revised cost matrix may be in the modified track associations data store 110-2 and may be utilized by the controller 202 for implementing safety features of a vehicle.

FIG. 5-1 illustrates an example 500 of a first feasibility matrix 502. The first feasibility matrix 502 includes lists of possible radar track candidates for each vision track 508 representing a whether the pair is feasible. The feasibility matrix may be represented two-dimensionally with a first dimension for vision tracks 504 and a second dimension for radar tracks 506. The first feasibility matrix 502 includes rows corresponding to the vision tracks 504 and columns corresponding to the radar tracks 506. The perception system 104 determines whether a probability of occlusion exists among the list of feasible radar candidates for a vision track and decides whether to penalize a radar track and vision track pair 508. Based on occlusion condition checking, the perception system 104 may apply an additional penalty to the previously estimated cost for the pair and update the matrix.

FIG. 5-2 illustrates an example 500-1 of a cost matrix 512-1 representing a radar track and vision track association. The cost matrix 512-1 may be transformed 514 into a second cost matrix 516 after inclusion of occlusion penalty. In aspects, the transformation 514 includes applying the occlusion constraint to the association maintained between the vision track and the radar track by including the occlusion penalty to the particular element of the cost matrix for the association maintained between the vision track and the radar track is evidence for not using the vision track for tracking objects in the environment.

For example, for a given vision track "j", one of its feasible radar candidates "i", is occluded by Nocc number of other radar tracks. Where "K" is a tuning parameter, the penalty of occlusion can be calculated as follows:

Occlusion Penalty$_{i,j}$ =

$$K * \text{Total } Az \text{ Overlap Ratio}_{i,j} * \sum_{n=1}^{Nocc_{i,j}} (Az \text{ Overlap Ratio}_{n,i,j} * AZ$$

Uncertainty Ratio$_{n,i}$ * (1 − Occluding Track Association Probability$_{n,i,j}$))

Where.

Total $Az$ Overlap_Ratio$_{i,j}$ =

$$\frac{\text{Combined azimuth overlap between all occluding radar tracks and radar track } i \text{ for vision track } j}{\text{Azimuth spread of radar track } i}$$

$Az$ Overlap Ratio$_{n,i,j}$ =

$$\frac{\text{Azimuth overlap between occluding radar track } n \text{ and occluded radar track } i \text{ for vision track } j}{\text{Azimuth spread of radar track } i}$$

$Az$ Uncertainty Ratio$_{n,i}$ =

$$\frac{\text{Azimuth uncertainty for occluding radar track } n}{\text{Azimuth uncertainty for radar track } i}$$

Occluding Track Association Probability$_{n,i,j}$ =

$$\sum_{k \neq j} \text{Association probability between}$$

an occluding track $n$ and other vision track $k$

In some examples the transformation may modify radar track and vision track matches with a high probability of occlusion. The cost matrix 512-1 may utilize information from a lookup table (not illustrated). The lookup table maintains a list of possible occluding radar tracks along with a number of occluding tracks for each radar track based on occlusion reasoning.

Figure 6:
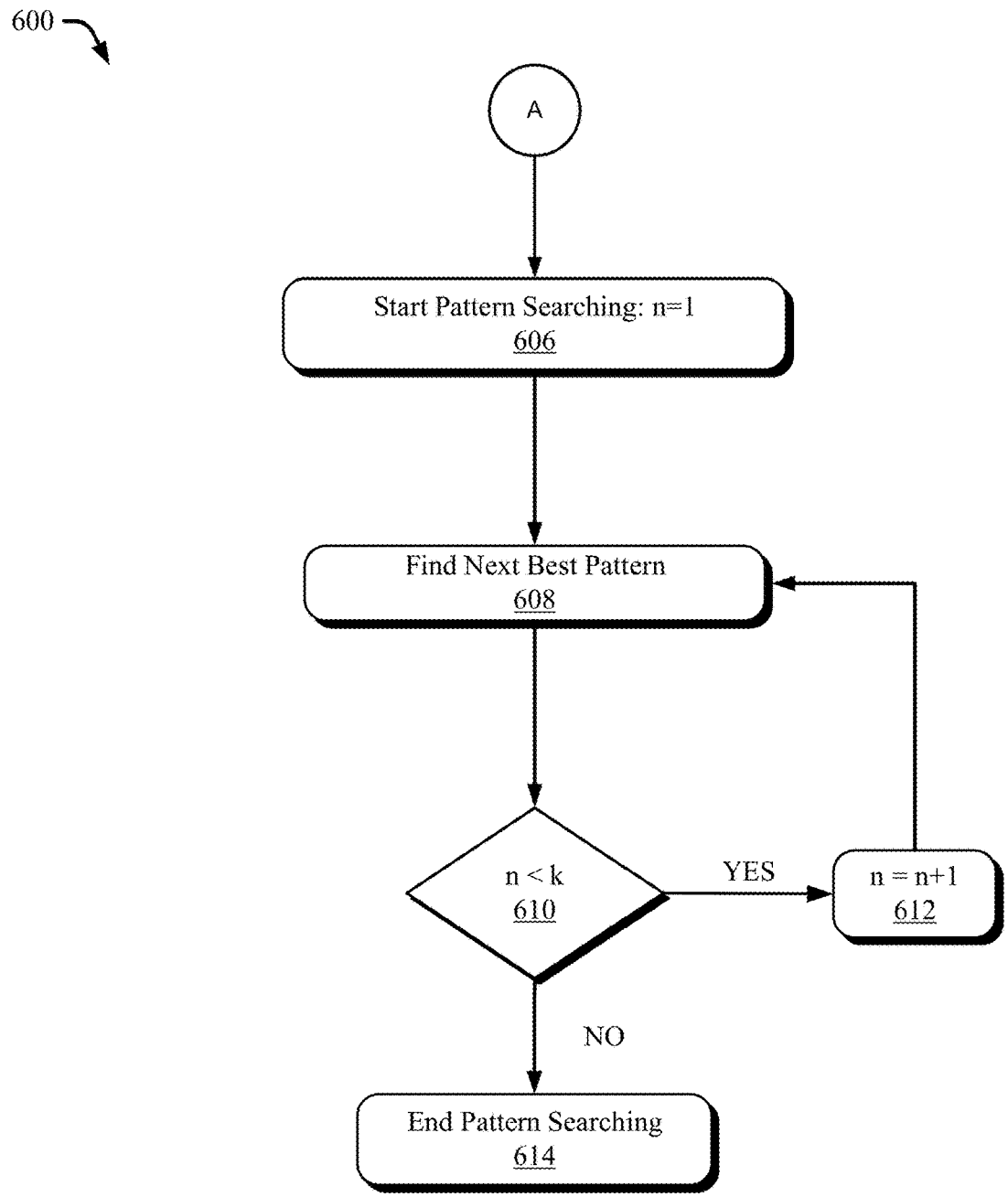
FIG. 6 illustrates additional example methods used in occlusion constraints for resolving tracks from multiple types of sensors.

FIG. 6 illustrates a method, wherein the revised cost matrix "A" of FIG. 4 undergoes processing by a k-best algorithm. The k-best algorithm may start pattern searching of "A" where n=1 606. The k-best algorithm finds the next best pattern 608. A determining step 610 occurs, where if "n" is less than "k", then n=n+1 612 and the find next best pattern 608 step is repeated. However, if "n" is not less than "k", then pattern searching ends 614. The k-best algorithm may be calculated in $O(kN^3)$ time complexity where "k" represents a number of best patterns to keep, "N" represents a number of feasible radar and vision tracks. Through using occlusion constraints and resolving the multiple sets of tracks, the revised cost matrix resulting at "A" of FIG. 5, maintains the execution time of the k-best algorithm shown in FIG. 6 remains constant, thereby allowing for faster and more accurate object reporting by the perception system. If the cost matrix was not revised/modified as per occlusion constraint, it is not possible to maintain a fixed execution time. In such case, after every pattern generated by the k best pattern finding method (608), the occlusion constraint is needed to be checked for that pattern. And if the occlusion constraint is not satisfied, the pattern needs to be discarded and the pattern searching method needs to rerun.

For example, processing by a k-best algorithm increases the functional performance and scalability of data processing by reducing the time complexity of the cost matrix normally used for object tracking based on sensor fusion even with an increasing number of possible track pairs.

Example Method

Figure 7:
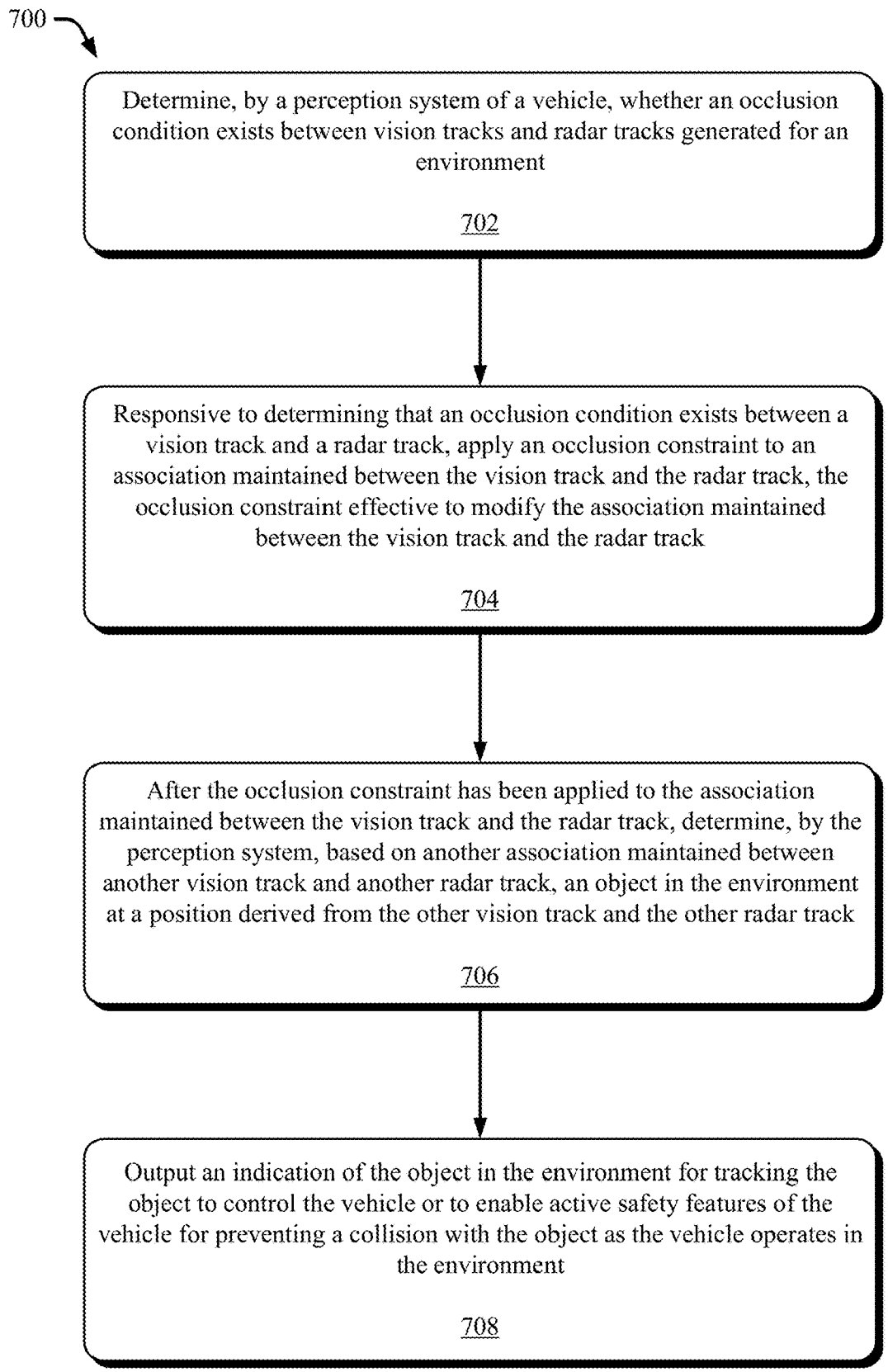
FIG. 7 illustrates an example method for occlusion constraints for resolving tracks from multiple types of sensors.

FIG. 7 illustrates an example method 700 for applying occlusion constraints for resolving tracks from multiple types of sensors. In this example, the method determines whether an occlusion condition exists and penalizes those radar track and vision track matches with a high probability of occlusion. The method may further process those radar track and vision track matches that have been penalized as a pre-processing step to reduce the processing time for the perception system 104.

At 702, the perception system 104 of a vehicle will determine whether an occlusion condition exists between vision tracks and radar tracks generated for an environment. In one example, the perception system 104 gathers radar data and vision data to determine objects in a field of view. In another example, the perception system 104 determines the existence of an occlusion condition based on the vision tracks and radar tracks.

At 704, responsive to determining that an occlusion condition exists between a vision track and a radar track, an occlusion constraint is applied to an association maintained between the vision track and the radar track, the occlusion constraint is effective to modify the association cost maintained between the vision track and the radar track. For example, a feasibility of association is formed when a radar track and a vision track met some distance proximity criteria and an aggregation of feasible radar tracks for each vision track is represented as a feasibility matrix. In another example, the aggregation of radar track and vision track pairs with a high probability of occlusion is penalized based on a probability of occlusion. In yet another example, penalized radar track and vision track association cost is modified.

At 706, after the occlusion constraint has been applied to the association cost maintained between the vision track and the radar track, the perception system 104 determines, based on another association maintained between another vision track and another radar track, an object in the environment at a position derived from the other vision track and the other radar track. For example, an association of radar track and vision track matches (e.g., a cost matrix) has deemphasized those matches with a high probability of occlusion, and the perception system 104 subsequently processes available revised data to identify occluded and non-occluded objects.

At 708, the perception system 104 outputs an indication of the object in the environment for tracking the object to control the vehicle or to enable active safety features of the vehicle for preventing a collision with the object as the vehicle operates in the environment. For example, the perception system 104 identifies an occluded object on a trajectory to collide with the vehicle and thereby controls the vehicle to enable a braking system to prevent a collision with the occluded object.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage media that is local and/or remote to a computer processing system, and implementations can include software applications, programs, functions, and the like. Any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Further Examples

Some further examples are described below:

Example 1: A method comprising: determining, by a perception system of a vehicle, whether an occlusion condition exists between vision tracks and radar tracks generated for an environment; responsive to determining that an occlusion condition exists between a vision track and a radar track, applying an occlusion constraint to an association maintained between the vision track and the radar track, the occlusion constraint effective to modify the association maintained between the vision track and the radar track; after applying the occlusion constraint to the association maintained between the vision track and the radar track, determining, by the perception system, based on another association maintained between another vision track and another radar track, an object in the environment at a position derived from the other vision track and the other radar track; and outputting an indication of the object in the environment for tracking the object to control the vehicle or to enable active safety features of the vehicle for preventing a collision with the object as the vehicle operates in the environment.

Example 2: The method of the preceding example, wherein determining whether an occlusion condition exists comprises: determining, with an azimuth uncertainty of occluding radar tracks and occluded radar tracks, whether any of the occluding radar tracks at least partially overlaps in azimuth with the vision track and the occluded radar tracks; and responsive to determining that at least one of the occluding radar tracks overlaps in azimuth with the vision track and at least one of the occluded radar tracks with sufficient azimuth certainty, determining that the occlusion condition exists between the vision track and the occluded radar track.

Example 3: The method of any preceding examples, further comprising: determining a probability of occlusion between the radar tracks and the vision track, the probability of occlusion indicative of a likelihood that the vision track represents a different object than each of the radar tracks, wherein determining whether an occlusion condition exists between the vision tracks and the radar tracks comprises determining whether the probability of occlusion between the radar tracks and the vision track is evidence for not using the vision track for tracking objects in the environment.

Example 4: The method of any preceding examples, further comprising: determining the probability of occlusion based on a total quantity of the occluding radar tracks that at least partially overlap in azimuth with the occluded radar track and the vision track and an amount of angular overlap associated with the total quantity of the radar tracks that at least partially overlap in azimuth with the occluded radar track.

Example 5: The method of any preceding examples, further comprising: generating a cost matrix that includes the association maintained between the vision track and the radar track as a particular element of the cost matrix, each other element of the cost matrix representing another association between a unique pair of the radar tracks and the vision tracks; and determining an occlusion penalty for the radar track and the vision track based on the probability of occlusion, wherein applying the occlusion constraint to the association maintained between the vision track and the radar track comprises adding the occlusion penalty to the particular element of the cost matrix for the association maintained between the vision track and the radar track to prevent using the vision track for tracking objects in the environment.

Example 6: The method of any preceding examples, wherein applying the occlusion constraint to the association maintained between the vision track and the radar track comprises increasing the cost of that pair in the cost matrix to deemphasize the association maintained between the vision track and the radar track.

Example 7: The method of any preceding examples, wherein each element of the cost matrix represents a distance between vision states and radar states associated with the unique pair of the radar tracks and the vision tracks with a penalty applied to some elements from applying the occlusion constraint.

Example 8: The method of any preceding examples, further comprising: each element of the cost matrix representing an association between a particular vision track and a particular radar track as a distance between states of each of the particular vision track and the particular radar track; the distance between the radar track and the vision track corresponds to a cost value of a particular element in the cost matrix; and the distance between a radar track and a vision track factors into a probability of occlusion.

Example 9: The method of any preceding examples, further comprising: each element of the cost matrix representing an association between a particular vision track and a particular radar track as a distance between positions of each of the particular vision track and the particular radar track corresponding to a cost value of a particular element in the cost matrix; and generating a probability of occlusion for each element of the cost matrix, the probability of occlusion based on one or more occluding radar tracks and an azimuth overlap between the occluding radar tracks and an occluded radar track.

Example 10: The method of any preceding examples, wherein determining an object in the environment at a position derived from the other vision track and the other radar track comprises determining a moving vehicle occluded from a vision sensor; and the moving vehicle is detected by a radar sensor.

Example 11: The method of any preceding examples, further comprising: modifying one or more elements that represent radar tracks with corresponding one or more vision tracks; and providing a revised cost matrix.

Example 12: The method of any preceding examples, wherein modifying the cost matrix comprises reducing complexity in k-best algorithm data input to a k-best algorithm by penalizing the association cost of a pair under occlusion constraint so that the pair becomes less likely to appear in a k-best patterns; and the k-best algorithm performed in $O(kN^3)$ time complexity where "k" represents a number of best patterns to keep and "N" represents a number of feasible radar or vision tracks.

Example 13: The method of any preceding examples, wherein modifying from the cost matrix comprises reducing complexity in a k-best algorithm given an execution time that remains constant with an increasing number of patterns.

Example 14: The method of any preceding examples, wherein providing a revised cost matrix comprises: deemphasizing at least one track from a set of tracks in response to determining a probability of occlusion for the set of tracks; and deemphasizing the at least one track from a set of tracks comprises retaining the at least one track for matching against a different track from a set of tracks.

Example 15: The method of any preceding examples, wherein a lookup table maintains a list of possible occluding radar tracks along with potential vision track pairs for each radar track based on occlusion reasoning.

Example 16: The method of any preceding examples, wherein calculating the probability of occlusion, by the perception system of the vehicle, can be modified based on a scenario as well as properties of a set of sensors.

Example 17: The method of any preceding examples, wherein the set of sensors are utilized to calculate the following track attributes: speed; range; and azimuth; wherein the speed, the range, and the azimuth operate as factors in evaluating occlusion probability.

Example 18: The method of any preceding examples, wherein the set of sensors comprise one or more radar sensors, lidar sensors, or ultrasound sensors and the set of sensors comprise one or more visual sensors.

Example 19: A system, the system comprising: a processor configured to perform the method of any preceding examples.

Example 20: A system comprising: means for performing the method of any preceding examples.

CONCLUSION

Although aspects of occlusion constraints for resolving tracks from multiple types of sensors have been described in language specific to features and/or methods, the subject of the appended claims is not necessarily limited to the specific features or methods described. Rather, the specific features and methods are disclosed as example implementations of the claimed occlusion constraints for resolving tracks from multiple types of sensors, and other equivalent features and methods are intended to be within the scope of the appended claims. Further, various aspects are described, and it is to be appreciated that each described aspect can be implemented independently or in connection with one or more other described aspects.

What is claimed is:
1. A method comprising:
 determining, by at least one processor of a perception system of a vehicle, whether an occlusion condition exists between vision tracks and radar tracks generated for an environment;
 responsive to determining that an occlusion condition exists between one of the vision tracks and one of the radar tracks, applying an occlusion constraint to an association maintained between the one of the vision tracks and the one of the radar tracks, the occlusion constraint effective to modify the association maintained between the one of the vision tracks and the one of the radar tracks;

after applying the occlusion constraint to the association maintained between the one of the vision tracks and the one of the radar tracks, determining, by the at least one processor, based on a k-best pattern search including others of the vision tracks and others of the radar tracks, another association maintained between another vision track and another radar track to determine a position of an object in the environment derived from the another vision track and the another radar track;

via the at least one processor, tracking the position of the object and controlling at least one of driving operations of the vehicle and active safety features of the vehicle to prevent a collision with the object;

generating a cost matrix that includes the association maintained between the one of the vision tracks and the one of the radar tracks as a particular element of the cost matrix, each other element of the cost matrix representing another association between a pair of the radar tracks and the vision tracks; and determining an occlusion penalty for the one of the radar tracks and the one of the vision tracks based on a probability of occlusion, wherein applying the occlusion constraint to the association maintained between the one of the vision tracks and the one of the radar tracks comprises adding the occlusion penalty to the particular element of the cost matrix for the association maintained between the one of the vision tracks and the one of the radar tracks to prevent using the one of the vision tracks for tracking objects in the environment.

2. The method of claim 1, wherein determining whether an occlusion condition exists comprises:

determining, with an azimuth uncertainty of occluding radar tracks and occluded radar tracks, whether any of the occluding radar tracks at least partially overlaps in azimuth with the one of the vision tracks and the occluded radar tracks, wherein the occluding radar tracks occlude the occluded radar tracks from the one of the vision tracks; and responsive to determining that at least one of the occluding radar tracks overlaps in azimuth with the one of the vision tracks, determining that the occlusion condition exists between the one of the vision tracks and the occluded radar tracks.

3. The method of claim 2, further comprising:

determining a probability of occlusion for each the radar tracks and the one of the vision tracks, the probability of occlusion indicative of a likelihood that the one of the vision tracks represents a different object than each of the radar tracks, wherein determining whether an occlusion condition exists between the vision tracks and the radar tracks comprises determining whether the probability of occlusion between the radar tracks and the one of the vision tracks is evidence for not using the one of the vision tracks for tracking objects in the environment.

4. The method of claim 3, further comprising determining the probability of occlusion based on a total quantity of the occluding radar tracks that at least partially overlap in azimuth with the occluded radar tracks and the one of the vision tracks and an amount of angular overlap associated with the total quantity of the radar tracks that at least partially overlap in azimuth with the occluded radar tracks.

5. The method of claim 1, wherein applying the occlusion constraint to the association maintained between the one of the vision tracks and the one of the radar tracks comprises increasing a cost of that pair in the cost matrix to deemphasize the association maintained between the one of the vision tracks and the one of the radar tracks.

6. The method of claim 1, wherein each element of the cost matrix represents a distance between vision states and radar states associated with the pair of the radar tracks and the vision tracks with a penalty applied to some elements from applying the occlusion constraint.

7. The method of claim 1, further comprising:

each element of the cost matrix representing an association between a respective one of the vision tracks and a respective one of the radar tracks as a distance between states of each of the respective one of the vision tracks and the respective one of the radar tracks;

the distance between the one of the radar tracks and the one of the vision tracks corresponds to a cost value of the particular element of the cost matrix; and the distance between the one of the radar tracks and the one of the vision tracks factors into the probability of occlusion.

8. The method of claim 1, further comprising:

each element of the cost matrix representing an association between a respective one of the vision tracks and a respective one of the radar tracks as a distance between positions of the respective one of the vision tracks and the respective one of the radar tracks corresponding to a cost value of the particular element of the cost matrix; and generating a probability of occlusion for each of the elements of the cost matrix, the probability of occlusion for each of the elements of the cost matrix being based on one or more occluding radar tracks and an azimuth overlap between the occluding radar tracks and an occluded radar track.

9. The method of claim 1, further comprising:

modifying, from the cost matrix, one or more elements that represent the radar tracks with a corresponding one or more of the vision tracks; and providing a revised cost matrix.

10. The method of claim 9, wherein modifying from the cost matrix comprises reducing complexity in k-best algorithm data input to a k-best algorithm by penalizing an association cost of a pair under occlusion constraint so that the pair becomes less likely to appear in a k-best patterns; and the k-best algorithm performed in $O(kN^3)$ time complexity where k represents a number of best patterns to keep, N represents a number of feasible radar or vision tracks.

11. The method of claim 10, wherein modifying from the cost matrix comprises reducing complexity in a k-best algorithm given an execution time that remains constant with increasing number of patterns.

12. The method of claim 9, wherein providing a revised cost matrix comprises:

deemphasizing at least one track from a set of tracks in response to determining a probability of occlusion for the set of tracks; and deemphasizing the at least one track from a set of tracks comprises retaining the at least one track for matching against a different track from a set of tracks.

13. The method of claim 9, wherein a lookup table maintains a list of possible occluding radar tracks along with potential vision track pairs for each of the radar track based on occlusion reasoning.

14. The method of claim 13, wherein calculating the probability of occlusion, by the perception system of the vehicle, can be modified based on a scenario as well as properties of a set of sensors.

15. The method of claim 14, wherein the set of sensors are utilized to calculate the following track attributes:
- speed;
- range;
- azimuth; and
- wherein the speed, the range, and the azimuth operate as factors in evaluating occlusion probability.

16. The method of claim 15, wherein the set of sensors comprises one or more radar sensors, lidar sensors, or ultrasound sensors and the set of sensors comprise one or more visual sensors.

17. A method comprising:
- determining, by at least one processor of a perception system of a vehicle, whether an occlusion condition exists between vision tracks and radar tracks generated for an environment;
- responsive to determining that an occlusion condition exists between one of the vision tracks and one of the radar tracks, applying an occlusion constraint to an association maintained between the one of the vision tracks and the one of the radar tracks, the occlusion constraint effective to modify the association maintained between the one of the vision tracks and the one of the radar tracks;
- after applying the occlusion constraint to the association maintained between the one of the vision tracks and the one of the radar tracks, determining, by the at least one processor, based on a k-best pattern search including others of the vision tracks and others of the radar tracks, another association maintained between another vision track and another radar track to determine a position of an object in the environment derived from the another vision track and the another radar track, wherein determining the position of the object in the environment derived from the another vision track and the another radar track comprises determining a moving vehicle occluded from a vision sensor, and wherein the moving vehicle is detected by a radar sensor; and
- via the at least one processor, tracking the position of the object and controlling at least one of driving operations of the vehicle and active safety features of the vehicle to prevent a collision with the object, wherein applying the occlusion constraint to the association maintained between the one of the vision tracks and the one of the radar tracks comprises adding an occlusion penalty to a particular element of a cost matrix for the association maintained between the one of the vision tracks and the one of the radar tracks to prevent using the one of the vision tracks for tracking objects in the environment.

18. A perception system of a vehicle, the perception system comprising a processor configured to:
- determine whether an occlusion condition exists between vision tracks and radar tracks generated for an environment;
- responsive to determining that an occlusion condition exists between one of the vision tracks and one of the radar tracks, apply an occlusion constraint to an association maintained between the one of the vision tracks and the one of the radar tracks, the occlusion constraint effective to modify the association maintained between the one of the vision tracks and the one of the radar tracks;
- after the occlusion constraint has been applied to the association maintained between the one of the vision tracks and the one of the radar tracks, determine, based on a k-best pattern search including others of the vision tracks and others of the radar tracks, another association maintained between another vision track and another radar track to determine a position of an object in the environment derived from the another vision track and the another radar track, wherein determining the position of the object in the environment derived from the another vision track and the another radar track comprises determining a moving vehicle occluded from a vision sensor, and wherein the moving vehicle is detected by a radar sensor; and
- track the position of the object and control at least one of driving operations of the vehicle and active safety features of the vehicle to prevent a collision with the object, wherein applying the occlusion constraint to the association maintained between the one of the vision tracks and the one of the radar tracks comprises adding an occlusion penalty to a particular element of a cost matrix for the association maintained between the one of the vision tracks and the one of the radar tracks to prevent using the one of the vision tracks for tracking objects in the environment.

* * * * *